United States Patent [19]
McClain et al.

[11] Patent Number: 5,217,610
[45] Date of Patent: Jun. 8, 1993

[54] APPARATUS FOR REMOVING METAL PARTICLES FROM A LIQUID AND METHOD FOR MAKING SAME

[75] Inventors: Judith M. McClain, Waterford; Virginia R. Harden, W. Bloomfield, both of Mich.

[73] Assignee: Elite Commercial & Industrial, Inc., Pontiac, Mich.

[21] Appl. No.: 852,328

[22] Filed: Mar. 18, 1992

[51] Int. Cl.$^5$ ............................................. B01D 35/06
[52] U.S. Cl. .................................. 210/223; 210/238; 210/471; 210/495; 210/497.01; 210/499; 112/262.2; 112/265.1
[58] Field of Search ............... 210/223, 238, 471, 495, 210/499, 497.01; 55/100; 335/303; 209/215, 223.1, 223.2, 224, 232, 636; 112/262.2, 265.1; 156/70, 93

[56] References Cited

U.S. PATENT DOCUMENTS

| | | | |
|---|---|---|---|
| 1,972,264 | 9/1934 | Hirschhorn | 210/471 |
| 2,789,655 | 4/1957 | Michael jet al. | 55/100 |
| 3,419,151 | 12/1968 | Smith et al. | 210/499 |
| 4,067,810 | 1/1978 | Sullivan | 335/303 |
| 4,545,833 | 10/1985 | Tafara | 112/262.2 |

Primary Examiner—Matthew O. Savage
Attorney, Agent, or Firm—Locke Reynolds

[57] ABSTRACT

An apparatus is described for removing metal particles from a liquid by means of a bag filter containing a plurality of magnets in linearly elongated interior pockets. A liquid containing metal particles passes from the interior of the bag filter through its exterior. The magnetic force associated with the magnets contained on the inside of the bag filter attract the metal particles thereto and hold such particles there against the pockets while the liquid passes through the bag filter.

9 Claims, 3 Drawing Sheets

APPARATUS FOR REMOVING METAL PARTICLES FROM A LIQUID AND METHOD FOR MAKING SAME

BACKGROUND OF THE INVENTION

The invention concerns an apparatus for removing metal particles from a liquid. The invention particularly concerns such an apparatus where a bag filter is used, the liquid to be filtered is passed through the bag filter.

The use of liquids, such as cutting oil, to extend the life of metal working machinery and to maintain the work surfaces at a constant temperature is well known. With current environmental regulations, however, the used oil which contains metal particles cannot simply be discarded. By filtering the metal particles from the cutting oil, the cutting oil becomes reusable and thereby creates less hazardous waste.

Also, manufacturers of metal products that use an ELPO system ("electronic deposition of paint") have a recirculating paint bath that the metal products are submerged in wherein the paint pigment is electronically deposited on the metal. During the submersion of the products, metal slivers and weld balls are initially washed off the products and are then electronically deposited back on the products to show up as dirt in the paint. By using a filter bag with a particular micron size to maintain cleanliness specifications, dirt particles are removed, but by the nature of the metal particles, they are able to work themselves through the filter media and still contaminate the paint bath.

Various ways to remove metal particles from a liquid have been attempted. The most often used method was to place a series of magnets into a metal cartridge filter. It has been asserted that these metal cartridge filters are easily cleaned and the magnets easily replaced. However, many of the cartridge filters contain a pleated-paper filter which actually performs the filtration. It has become apparent the pleated-paper filters are not sufficiently resilient to withstand long-term use without tearing. The application of the cartridge filter is also limited by its shape, its inability to withstand high temperatures and low liquid flow rates.

It has also been suggested that simply placing a magnet in the bottom of a bag filter would be sufficient means to remove metal particles from a liquid. The problem with this method is that much of the liquid which passes through a bag filter exits from the sides of the filter. By only creating a small or localized magnetic force in the filter, much of the liquid passes through the filter uninfluenced by the magnetic force and, therefore, most metal particles are not removed from the liquid.

While being somewhat effective, the prior art has not achieved the desired results and still fails to solve many of the technical problems which previously existed. The metal cannister filters have been ineffective in preventing metal particles which have collected around the magnets from coagulating and breaking away from the magnetic force. In fact, the metal cartridges often become clogged with metal particles which have been removed from the liquid. The metal cartridge filters have also failed in their attempts to present a filter in which the magnets are easily replaced, and the filter is easily cleaned. In addition, the metal filters which contain a pleated-paper filter often tear and thus, cease to perform their filtration function.

SUMMARY OF THE INVENTION

An apparatus for filtering metal particles from liquids comprises a porous sheath having an open upper end, a closed lower and a longitudinal axis, a support ring circumferentially attached to the open end of the sheath, a plurality of longitudinally aligned elongated pockets having open and closed ends attached to the inner surface of said sheath, the open end adjacent to said support ring and the closed end adjacent to the closed end of said sheath, and a plurality of linearly elongated magnets received within said pockets wherein one of said magnets corresponds to one of said pockets. Two handles are attached to the support ring, the handles extending away from the sheath.

The solutions to many of the problems existing in the prior art are achieved by creating a bag filter of porous fabric which contains linearly elongated pockets. A similarly shaped magnet is placed into the pocket. The fabrics used to form the filter are durable and able to withstand liquids which are both high and low in temperature. The new bag filter concentrates both metal and regular dirt particles making more disposal possible than that afforded by cartridge filters. Also, the magnets are reusable.

One feature of the filter is that a variety of porous fabrics may be used to form the filter. The advantage over the metal cartridge filters previously used is that the fabrics may be chosen so the useful life of the filter is increased. Another advantage is the filter may be customized to be compatible with the liquid to be filtered. For example, a polyester-based fabric is useful to filter oils which are used at a high temperature. In water-based coolant, a fabric bag according to the present invention is capable of removing oils and metallic particles, and other particulates.

Another feature of the invention is the linear elongated pockets which serve to hold the magnets. The placement of the fabric allows it to pick up more particles from the liquid. The fabric used for the pocket is the same as the bag or a similarly compatible material for the application. The use of felted fabric used in the pockets give the metal particles and weld balls a place to rest on the fabric to prevent migration once maximum usage is achieved.

Another feature of the invention is the use of a durable linearly elongated bar magnets. The advantage of the use of a bar magnets over a series of magnets, as illustrated in the prior art, is that the series of magnets is likely to lose its effectiveness. The bar magnet is designed so it loses only one-half of 1% of its strength in 100 years. Another advantage is that by using a durable magnet, the filter is able to withstand both high and low liquid temperatures.

The most important feature, when combining all of the previously described attributes of the invention is the increased useful life. The advantages of a filter with an increased useful life are the following: the cost to use the filter is lower because the components do not need to be replaced as often as other embodiments, the magnets are of a high quality that do not lose their strength, and the fabric used to form the filter is durable. In addition, the magnets may be removed from the filter, the magnets cleaned and then reused.

The use of magnetics with a filter bag has held up to at least 100% more dirt than a conventional dirt bag, with the increased weight being metal products. This helps to improve the quality of the products being painted by reducing the amount of sanding that has to be done after the ELPO paint, but before the finish coat of paint. Thus two jobs are done at the same time with no reduction in flow rates to maintain production output.

Additional features and advantages of the invention will become apparent to those skilled in the art upon consideration of the following detailed description of a preferred embodiment exemplifying the best mode of carrying out the invention as presently perceived. The detailed description particularly refers to the accompanying drawings.

DESCRIPTION OF THE PREFERRED EMBODIMENT

Figure 1:
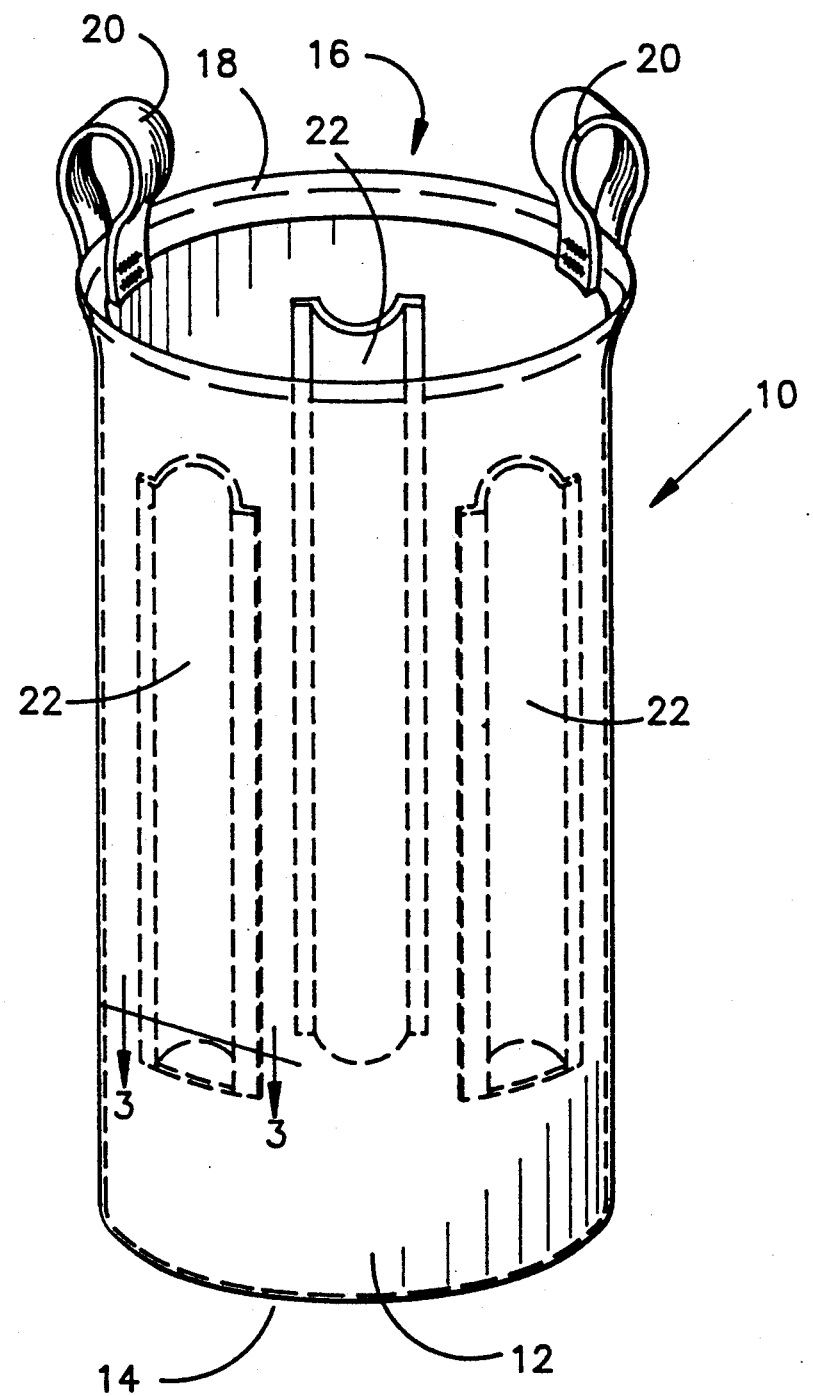
FIG. 1 is a diagrammatic view of a bag filter with space for three magnets in accordance with the present invention.

As illustrated in FIG. 1, the bag filter 10 is composed of a sheath of porous fabric 12 sewn into a cylinder having a closed lower opening 14 and an open top 16 suspended from a support ring 18. Two handles 20 are sewn to the porous fabric sheath 12 around the support ring 18 to provide for insertion and removal of a filter bag into and from filtration equipment.

Figure 2:
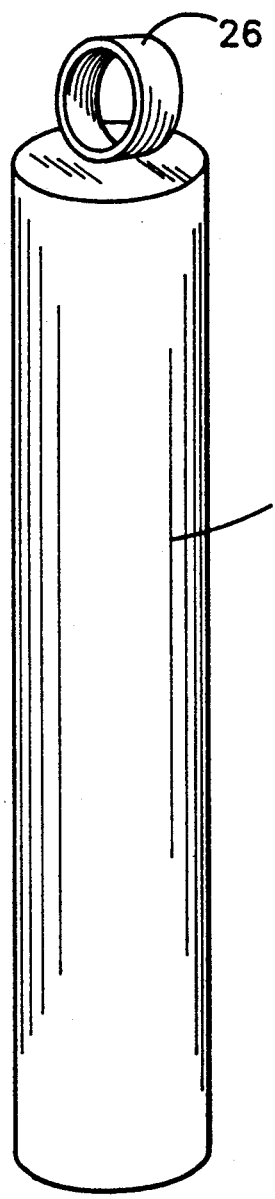
FIG. 2 is a diagrammatic view illustrating the shape of the linearly elongated magnets used with the bag filter shown in FIG. 1.
Figure 3:
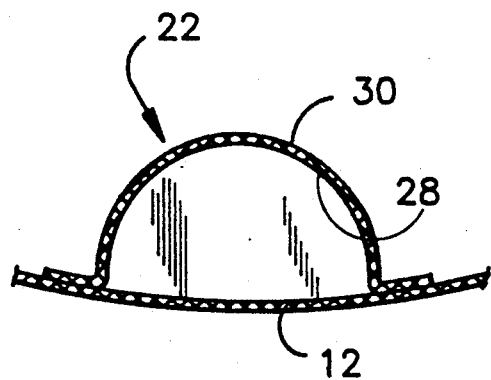
FIG. 3 is a cross-sectional view of a pocket taken along the line 3—3 in FIG. 1 illustrating the fabric which forms the linearly elongated pockets.

At least two linearly elongated pockets 22 are sewn to the porous sheath 12 to contain magnets 24. The magnet 24, as illustrated in FIG. 2, has a stainless steel circular handle 26 at the upper end for easy removal and insertion of the magnet 24 into the pocket 22 of the bag filter 10. As illustrated in FIG. 3, the cross-section line 3—3 of FIG. 1, the inner surface 28 of pocket 22 is shown to be the same fabric as the outer surface 30 of the pocket 22.

As an example of the use of the apparatus, the bag filter 10 is inserted to filtration equipment via the handles 26. The support ring 18 holds the bag filter 10 in its proper position within the filtration equipment. The magnet 24 may be inserted into the linear pocket 22 either prior to the introduction of the bag filter 10 into the filtration equipment, or after the bag filter 10 has been properly located within the filtration equipment using the circular handle 26 on the magnet 24.

In use, a liquid containing metal and other particles is introduced into the bag filter 10 from the open upper end 16 in the conventional manner. As the liquid passes through the bag filter 10, the magnets 24, attract the metal particles contained in the liquid. The particles are retained against the surface 30 of the pocket 22, while the remaining liquid flows through the porous fabric sheath 12 and out bag filter 10.

A second embodiment consists in the use of a smaller support ring 18 in which only two linear pockets 22 are sewn into the porous fabric sheath 12 to contain two magnets 24. The bag filter 10 can be made of the appropriate size and contain the appropriate number of magnets 24 to address a variety of applications.

Widespread use of the filter in a variety of applications is possible based upon the fact that the filter can be adapted to a variety of equipment. In order to accommodate different types of filtering equipment, the bag filters can be of different lengths. The length of the bag filter is only limited by the size of magnets available. Currently, magnets are available in 12, 18, 24 and 32 inch lengths. Additional flexibility and support can also be determined by the type and size of support ring used. Support rings are currently used from about 6" to about 9" in diameter. The size decision is based upon the associated filtering equipment. The standard size ring is generally 7" in diameter. Rings can be made of various materials including carbon steel, stainless steel, or plastics. The material chosen must be appropriate for the anticipated use.

It is crucial for the successful performance of the filter that the fabric which is used to form the filter is carefully selected for the particular application. This fabric choice is based upon the properties of the fabric including its resiliency, heat resistence, chemical compatability and porosity. The user must also factor into account what contaminants are contained in the liquid to be filtered. For example, NOMEX ® (poly(m-phenylene isopthalamide)) based fabrics have been used in applications where the liquid is at a high temperature due to the its ability to withstand high temperatures. Other fabrics' compositions including polyesters, polypropylenes, nylons, acetate and rayons have been used when temperature concerns are not the controlling issue.

Generally, the fabrics used have openings ranging in size from about 1 to about 800 microns. Specifically, the polypropylene fabric which is used ranges in weight from about 10 to about 18 ounces per square yard. The polyester fabrics range in weight from about 8 to about 18 ounces per square yard.

The thickness of the polypropylene fabric ranges from about 0.055 to about 0.130 inches. The acetate fabrics range in thickness from about 0.05 to about 0.250 inches, while the polyamide fabrics range in thickness from about 0.060 to about 0.170 inches. The polyester fabrics range in thickness from about 0.055 to about 0.150 inches.

A liquid will pass through the polypropylene fabrics at a rate from about 10 to about 350 gallons per minute (gpm), while the polyester will conduct liquid at a rate from about 10 to about 550 gpm.

Figure 4:
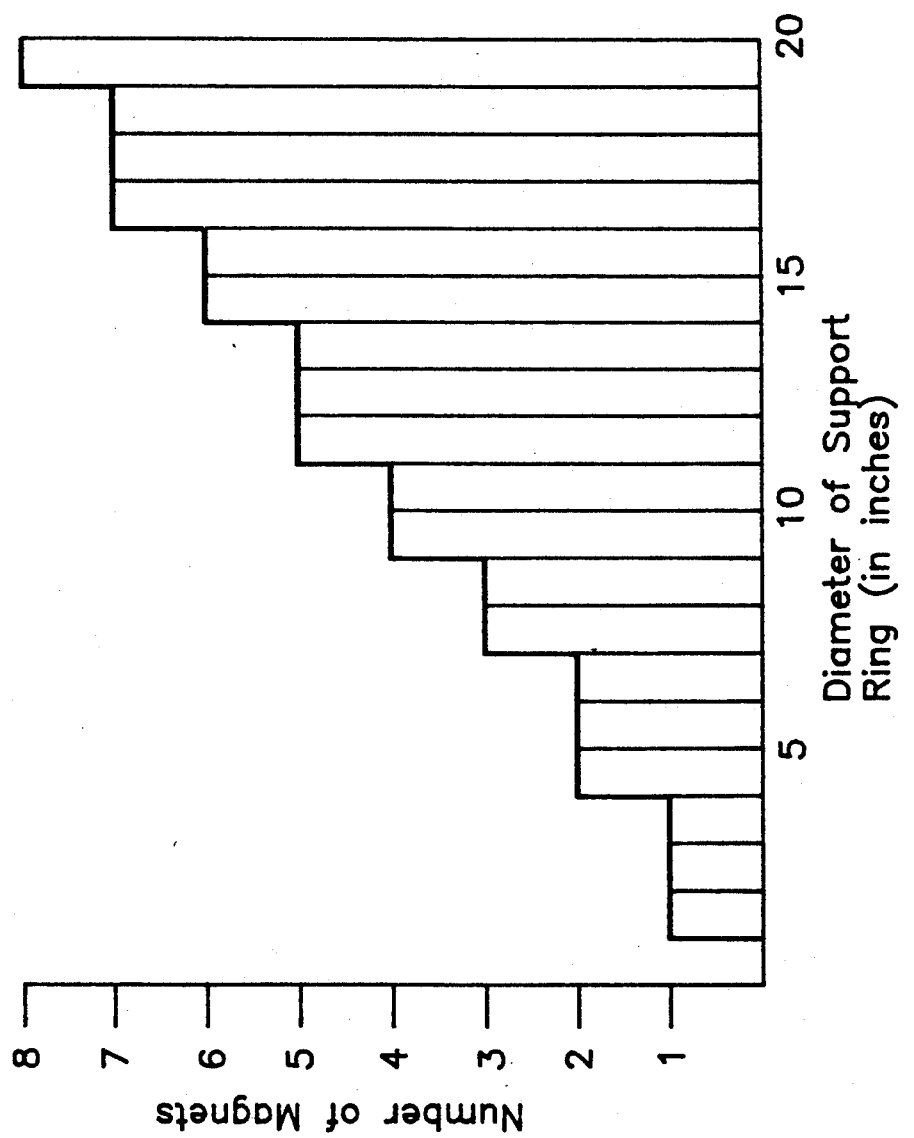
FIG. 4 a chart relating the number of magnets required to the diameter of the support ring.

As illustrated in FIG. 4, the size of the support ring needed dictates the number of magnets which will be used in the filter. This calculation is made by determining the circumference of the support ring using the formula: $c = 11 \times d$. After the circumference is calculated, the fabric is cut equal to that amount plus at least a ¼" for a seam allowance. Typically, each co-joined end has a ¼" seam. The pockets for the magnets are then spaced about 4 to 8 inches apart. In order to obtain spacing, the fact that the two ends of the fabric will soon be joined must be taken into account when locating the pockets upon the fabric prior to cojoining the edges.

The pockets are typically made from the same fabric as the remainder of the bag filter. The pockets are formed so the outer side, which has a greater surface area, is situated so it will face the interior of the filter and come into contact with the liquid. This allows the pocket to come into contact with and trap a greater number of the metal particles so the magnet contained in the pocket can work more effectively.

The magnets are Ceramic 5 or Ceramic 8. This is a rating means assigned by the Magnetic Materials Producers Association (hereinafter "MMPA") according to their publication entitled, "The Standard Specification for Permanent Magnet Materials." The MMPA will only classify a magnet as a "permanent magnet material" if the magnet is capable of retaining its strength over its useful life. A permanent magnet material may only lose one-half of 1% of its strength every 100 years. Permanent magnet materials also have a coercive force generally greater than 120 Oersteds (hereinafter "Oe").

A ferrite or ceramic permanent magnet has the general formula of $MO\ 6Fe_2O_3$, wherein "M" generally represents barium, strontium, or a combination thereof. While Ceramic 5 and Ceramic 8 refer to the original MMPA classifications, recently, the MMPA has created a brief designation which is based upon the maximum energy product and intrinsic coercive force of the magnet. For example, a Ceramic 5 magnet has a brief designation of 3.4/2.5. This brief designation means the maximum energy product of a Ceramic 5 magnet is 3.40 megagauss-oersteds (MGO) and an intrinsic coercive force of 2500 Oe (2.5 kOe). A Ceramic 8 magnet may also be classified under the brief designation of 3.5/3.1. Applying the same interpretation, the Ceramic 8 brief designation means the maximum energy product of the magnet is 3.5 MG), while the intrinsic course of force is 3050, rounded to 3.1 kOe. The other two measurements of magnetic properties which are applicable to a Ceramic 5 magnet are a residual induction of at least 3800 gauss and a coercive force of at least 2400 O3. A Ceramic 8 magnet has a residual induction of 3850 gauss and a coercive force of 2950 Oe. The International Electrotechnical Commission (IEC) uses a different classification system for naming magnets. For example, a Ceramic 5 magnet would be designated an Sl-1-6 magnet by the IEC, while a Ceramic 8 magnet would be Sl-1-5. The IEC designations are merely provided as a cross-reference.

In comparing the intrinsic properties of a Ceramic 5 and Ceramic 8 magnet, one can deduce that a Ceramic 5 and a Ceramic 8 magnet basically have the same strength. However, a Ceramic 8 magnet is heat resistent and can be used in this application in combination with a polyester or NOMEX ® based fabric for filtering a high temperature liquid.

Although the invention has been described in detail with reference to certain preferred embodiments, variations and modifications exist within the scope and spirit of the invention as described and as defined in the following claims.

What is claimed is:

1. An apparatus for filtering metal particles from liquids comprising:
   a porous sheath formed of a fabric material, said sheath having an upper open end, a lower closed end, and a longitudinal axis;
   a support ring circumferentially attached to the open end of the sheath;
   two handles attached to the support ring, said handles extending away from said sheath;
   a plurality of elongated pockets alinged substantially parallel to said longitudinal axis and being attached to an inner surface of said sheath, each said pocket having open and closed ends, the open end of each said pocket being adjacent to said support ring, the closed end of each said pocket being adjacent to the closed end of the sheath; and
   a like plurality of linearly elongated magnets, each elongated magnet being received within a respective one of said pockets.

2. An apparatus as described in claim 1, wherein the support ring is formed of a material selected from the group consisting of stainless steel, plastic, and carbon steel.

3. An apparatus as described in claim 1, wherein the support ring has a diameter of at least seven inches and the sheath contains at least three pockets.

4. An apparatus as described in claim 1 wherein said fabric material is selected from the group consisting of polyesters, polypropylenes, nylons, poly(m-phenylene isopthalamide, acetate, and rayons.

5. An apparatus as described in claim 1 wherein the magnet inserted into each of said pockets comprises a magnet having a one inch external diameter and a loop attached at one end thereof for lifting the magnet, the loop acting as a handle to remove the magnet for cleaning and replacement.

6. Apparatus as described in claim 1 wherein the pockets are formed of a fabric material, each said pocket having an inner surface contacting a respective said magnet and each said pocket having an outer surface contacting the liquid containing metal particles.

7. A method for the production of a filtering device for the simultaneous removal of magnetic and non-magnetic pollutants from a liquid containing such pollutants, the method comprising the steps of:
   forming a support ring having a diameter;
   forming a porous sheath from a fabric material, said sheath having an open end, a closed end, and a longitudinal axis;
   circumferentially attaching the open end of said porous sheath to said support ring;
   determining the number of magnets needed for filtering purposes based upon the diameter of said support ring;
   circumferentially attaching a plurality of elongated pockets to an inner surface of said sheath such that the elongated pockets are aligned substantially parallel to said longitudinal axis, each said pocket having open and closed ends, the open end of each said pocket being located adjacent to said support ring and the closed end of each said pocket being located adjacent to the closed end of the sheath, the number of pockets corresponding to the number of magnets; and
   placing a magnet in each of the pockets wherein the magnets are easily inserted and removed from the pockets.

8. The method of claim 7 further comprising the step of providing handles attached to the support ring, said handles extending away from said sheath, and providing each said magnet with a handle to permit the ready removal and insertion of the magnet into each pocket.

9. The method of claim 7, further comprising the step of choosing said fabric material from the group consisting of polyesters, polypropylenes, polyamides, acetates, nylons, poly(m-phenylene isopthalamide, and rayons.

* * * * *